ANNULAR ROTARY REACTOR

Filed Nov. 1, 1968

Inventor
Robert D. Frans
By Arthur M. Streich
Attorney

United States Patent Office 3,531,095
Patented Sept. 29, 1970

3,531,095
ANNULAR ROTARY REACTOR
Robert D. Frans, Middleburg Heights, Ohio, assignor to Allis-Chalmers Manufacturing Company, Milwaukee, Wis.
Filed Nov. 1, 1968, Ser. No. 772,760
Int. Cl. F27b 9/16
U.S. Cl. 263—7                                5 Claims

ABSTRACT OF THE DISCLOSURE

An apparatus is disclosed including an annular rotary reactor assembly having at least two treatment chambers and an annular grate of perforated segments that rotate around an annular path in a horizontal plane and through the chambers. A ball charging zone is defined by a chute provided to deposit a bed of steel balls on the grate, with the balls being larger than perforations in the grate segments. A hopper is provided to hold a supply of particles of material to be treated, screened to be smaller than the steel balls, and the hopper is arranged to deposit these particles on top of the bed of steel balls for treatment in the chambers. While passing through the first chamber the steel balls pick up and store heat absorbed from a gas flow therethrough and while passing through the second chamber the steel balls give up the acquired heat to a cooler gas stream flowing therethrough. After traveling around the annular path and through the chambers, a segment with steel balls and material thereon arrives at a discharge station where the segment is tilted and both the steel balls and treated material are dumped to a screen that separates the steel balls from material that has been treated thereon. The steel balls being larger than the particles of treated material may be recovered substantially free of other material by screening and then returned to the chute for redeposit on the grate. The end of the discharge station is adjacent the beginning of the ball charging zone and substantially the entire grate is uniformly loaded with the steel balls, except for the grate segments passing through the discharge station.

CROSS REFERENCE TO RELATED PATENT APPLICATION

The annular rotary reactor disclosed in this patent application is also disclosed as having utility as part of a system which is the subject of my copending United States patent application Ser. No. 772,753 entitled "Apparatus and Process for Reducing the Oxygen Content of Oxidic Mineral Ore" filed concurrently herewith Nov. 1, 1968.

BACKGROUND OF THE INVENTION

Field of the invention

This invention relates to a gas-solids reactor and in particular to a moving grate-hearth type reactor such as utilizes two or more gas flows to dry, heat, burn, roast or cool in stages; or performs two or more of such operations in a single reactor.

Description of the prior art

Two types of moving grate-hearth type reactors have been used extensively for gas-solids reactions involving drying, heating, burning, roasting or cooling. A first type, and the type to which the present invention relates, involves an annular platform which revolves in a horizontal plane about a vertical axis. The second type involves over and under strands of an endless loop in which each segment of the grate travels on the upper horizontal strand of the loop and carries material to be treated from a charging station to the end of the upper strand where the material is dumped as the grate turns downward. Each such grate segment, after discharging the material therefrom, travels on the lower strand back to the charge end of the machine.

The first type, involving a horizontal annular platform, has been known to this art at least since U.S. Pat. 520,369 of 1894. The evolution of the early concepts to modern forms of annular grates and hearths may be seen in typical patents and publications that have appeared since 1894 and including such as U.S. Pat. 2,256,017 of 1941; U.S. Pat. 2,296,791 of 1942; U.S. Pat. 2,793,109 of 1957; U.S. Pat. 3,160,402 of 1964; U.S. Pat. 3,199,850 of 1965; U.S. Pat. 3,232,714 of 1966; U.S. Pat. 3,302,936 of 1967; and Mining Congress Journal for August 1968 at pages 39–45.

The second type, with its endless loop of over and under strands, has been known to this art at least since U.S. Pat. 1,433,350 of 1922. The evolution of the early concepts to modern forms of this type may be seen in typical patents that have appeared since 1922 and including such as U.S. Pats. 1,926,032 of 1933; 2,143,905 and 2,174,066 of 1939; patents to Dr. O. G. Lellop U.S. 2,750,272; U.S. 2,750,273 and U.S. 2,750,274 of 1956 and U S. Pat. 3,042,390 of 1962.

The aforementioned second type is also well known to the art as a suitable device for pretreating material prior to treatment in a rotary kiln. Examples of such are found in U.S. Pat. to Lellep 2,644,601 of 1949; U.S. Pat. to Stowasser 2,925,336 of 1960; my own U.S. Pat. 3,313,534 of 1967; and U.S. patent to Jennrich et al. 3,396,952 of 1968.

Despite widespread use of the second type, both as a primary treatment apparatus and as a pretreatment device for such as rotary kilns, there are certain technical applications for which the first type is better suited. An example of such an application may be one involving the need for a very long treatment path, in which case the annular device can sometimes be fitted into available space not long enough for the second type. Furthermore, it is sometimes desirable or necessary that grate side walls be refractory lined and such material can be applied and used with a resonable life expectancy when applied to the first (i.e., annular) type. However, refractory side walls are not as easily applied successfully to the second type, with its over and under strands. The refractory can fail and drop out where segments of such a grate traveling on the top strand turn downwardly for return travel on the lower strand, because the grate segments are tipped over to an upside-down position for travel on the return strand.

All of the aforementioned prior art patents and the publication referred to are helpful to understand the evolution of the technology and some of such prior art includes disclosures that relate to multilayer material beds with hearth layers or beds on moving platforms. However the teachings or prior art are different and not directed to the concepts involved in the present invention that will be hereinafter described.

SUMMARY OF THE INVENTION

It is an object of the present invention to provide a new and improved annular rotary reactor in which a plurality of reusable particles of a heat absorbing media form a bed on a perforated annular grate for carrying a layer of material for treatment through treatment chambers to absorb thermal energy from a heated gas (the gas may be heated before entering the reactor or by the material being treated) passing downwardly therethrough in a first of the chambers and recover the absorbed thermal energy for other process use or reuse by transferring such energy to a second gas flow through the media in subsequent chamber, with substantially the entire annular grate being uniformly loaded with the media.

It is another object of the present invention to provide a new and improved annular rotary reactor in which a plurality of reusable steel balls form a bed on a perforated annular grate for carrying a layer of material for treatment through treatment chambers to absorb thermal energy from a heated gas passing downwardly therethrough in a first of the chambers, recover the absorbed thermal energy for other process use or reuse by transferring such energy to a second gas flow through the the steel balls in a subsequent chamber, and separate the steel balls from treated material in order to reform a bed with such separated steel balls substantially free of other material.

Another object of the present invention is to provide a new and improved annular rotary reactor in which a plurality of reusable steel balls form a bed on a annular grate having perforations smaller than the steel balls for carrying a layer of particles of material smaller than the steel balls, for treatment through treatment chambers to absorb thermal energy from a heated gas passing downwardly therethrough in a first of the chambers, recover the absorbed thermal energy for other process use or reuse by transferring such energy to a second gas flow through the steel balls in a subsequent chamber, and screen the steel balls from treated material in order to reform a bed with such screened steel balls substantially cleaned and free of other material.

According to a preferred embodiment of the present invention an annular rotary reactor assembly is provided with a sequential arrangement of a ball charging zone, a mineral charging zone, at least two mineral treatment chambers and a discharge station, with the end of the discharge station being adjacent the beginning of the ball charging zone. A chute is provided at the ball charging zone to deposit on perforate segments making up the grate, a bed of steel balls larger than the perforations in the grate segments. A hopper is provided at the mineral charging zone to hold particles of material to be treated that have been screened to be smaller than the steel balls.

The hopper is so arranged to deposit the particles to be treated, on top of the steel balls. The grate rotates and the grate segments carry the steel balls covered with material to be treated into the first treatment chamber where a downward flow of gas heated either before it enters the reactor, as it passes through the material being treated, or both, transfers its heat to the steel balls where the heat is stored thus protecting the grate from high temperature and this thermal energy is carried into the second chamber where this heat is recovered for other process use or reuse by a second and relatively cool gas stream, preferably upflow for maximum heat recovery under circumstances that will be hereinafter explained. After traveling around the annular path and through the chambers, a segment with steel balls and mineral particles thereon arrives at the discharge station where the segment is tilted. Tilting a segment at the discharge station dumps the steel balls and particles of now treated mineral material to fall upon and tumble down an inclined screen which separates the treated mineral particles from the steel balls and the steel balls are cleaned of any surface deposits of the mineral before being returned to the ball charging chute. Each segment of the grate, after dumping its load, immediately reenters the adjacent ball charging zone where a bed of steel balls is redeposited thereon. Thus substantially the entire grate is uniformly loaded, except for grate segments passing through the discharge station, with steel balls that act both as a heat transfer media and a grate protecting bed.

Other features and objects of the invention that have been attained will appear from the more detailed description to follow with reference to an embodiment of the present invention shown in the accompanying drawings.

DESCRIPTION OF THE PREFERRED EMBODIMENT

Figures 1, 2:
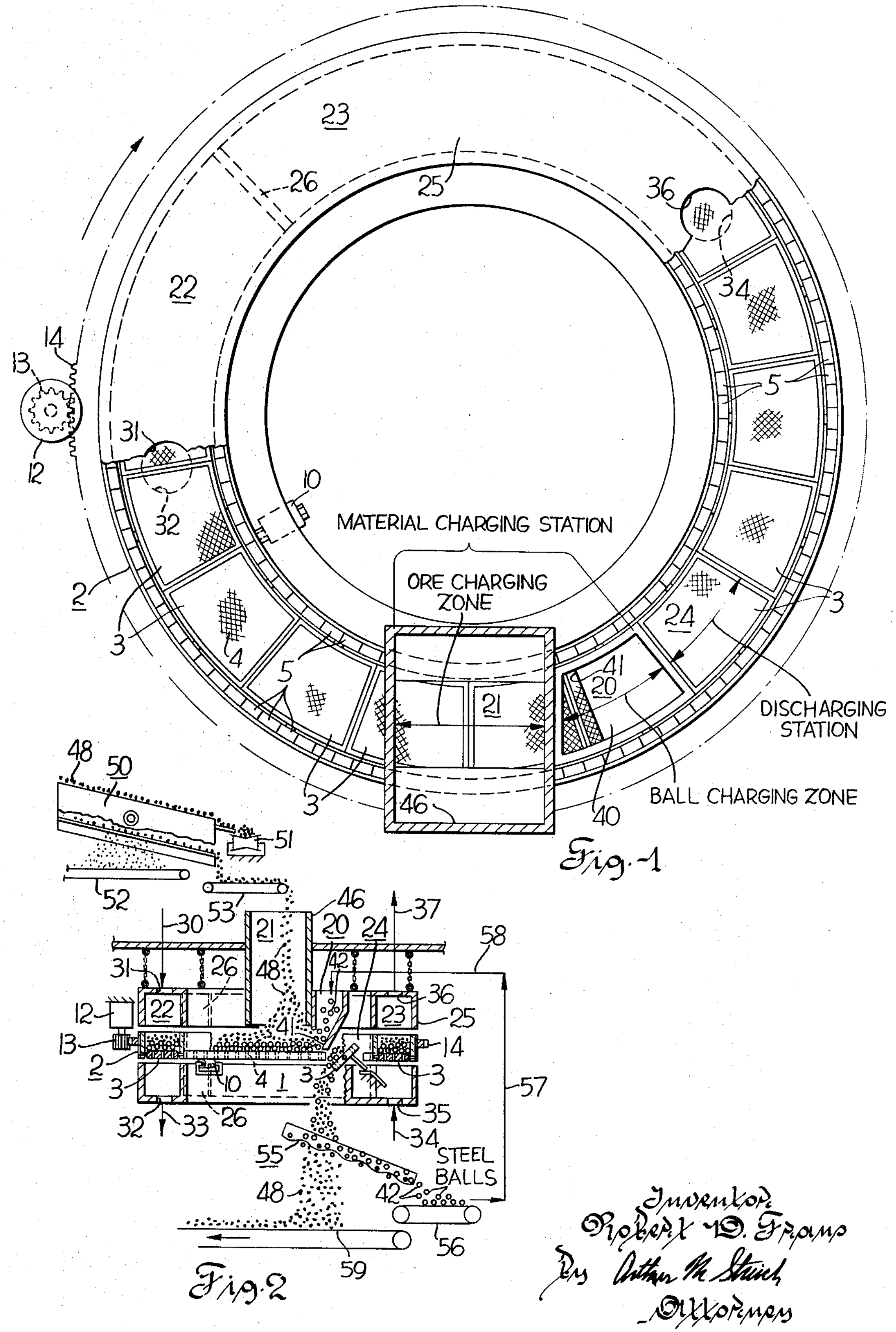
FIG. 1 of the accompanying drawing shows a top view, partly in section, an annular rotary reactor according to the present invention.
FIG. 2 is a diagrammatic side elevation, partly in section, of an assembly as shown in FIG. 1 with other pieces of apparatus associated therewith in a manner according to the present invention.

Referring to FIGS. 1 and 2 of the drawings, a rotary reactor assembly 1 is shown as having an annular grate 2 made up of a plurality of grate segments 3 each having a plurality of perforations 4 of substantially uniform predetermined size. The side walls of the segments 3 may be covered with a heat or corrosion resistant material, such as refractory brick 5. The entire grate 2 is supported for rotation about a central vertical axis by suitable means which may be for example a plurality of support rollers 10 (only one of which is shown in each figure of the drawing) arranged to engage a flange portion 11 (FIG. 1) and carry the revolving annular grate 2. The grate 2 may be revolved by a motor 12 driving a pinion gear 13 engaging a ring gear 14 around the annular grate 2 to rotate in the direction indicated by an arrow in FIG. 1.

The assembly 1 is provided with a sequential arrangement of a ball charging zone 20, a mineral ore charging zone 21, at least two mineral treatment chambers 22, 23 and a discharge station 24 with the end of the discharge station 24 adjacent the beginning of the ball charging zone 20. The two chambers 22, 23 are defined by stationary gas confining means 25 divided by baffles 26 above and below grate 2 within gas confining means 25. A gas flow path through the first treatment chamber 22 and the perforated plates 3 within chamber 22, is established by a conduit, indicated by an arrow 30, a port 31, a port 32, and a conduit indicated by an arrow 33. A gas flow path through the second treatment chamber 23 and the perforated plates 3 within chamber 23, is established by a conduit indicated by arrow 34, a port 35, a port 36, and a conduit indicated by an arrow 37.

The ball charging zone 20 is defined by a chute 40, projects downwardly from at least the level of the top of the gas confining means 25 and terminates with a lower lip 41 in close spaced relation to the top surface of the grate but with at least enough clearance so as to not interfere with the movement of the grate segments 3 beneath lip 41. A plurality of steel balls 42 of a substantially uniform size, larger than perforations 4 in grate segments 3, is provided for charging chute 40.

The mineral ore charging zone 21 is defined by a hopper 46 also projects downwardly from at least the level of the top of the gas confining means 25 to a position spaced above the lip 41 of chute 40.

Means for delivering to the hopper 46 particles 48 of material to be treated in the reactor 1, may include a screen 50 for delivering oversize material to a conveyor 51, fines to a conveyor 52 and particles within predetermined size limits, smaller than balls 42, to a conveyor 53 for charging to hopper 46.

Means for separating steel balls 42 from particles of material 48 after treatment of the particles in the reactor 1, are indicated as comprising an inclined screen 55 for delivering the steel balls 42 to conveyors 56, 57, 58 for recycling the steel balls 42 back to chute 40 while the particles of material 48 may be carried away on conveyor 59.

In the operation of the apparatus that has been described the material 48 may be iron ore pellets as described in my concurrently filed patent application entitled, "Apparatus and Process for Reducing Oxygen Content of Oxidic Mineral Ore" previously referred to, in which case other equipment therein disclosed would be arranged between the conveyor 53 and the hopper 46, and the function of reactor 1 would be to perform a reducing roast in chamber 22 and a cooling operation in chamber 23 with nonoxidizing gases. Such is not the only utility however for the disclosed reactor. The disclosed reactor may be advantageously applied to iron or pellet oxidizing operations, such as disclosed in the previously identified August 1968 issue of Mining Congress Journal beginning at page 39. The reactor could also be used to produce special portland cements, requiring very high temperature processing, according to a process disclosed in Canadian Pat. 738,328 of 1966.

In any event, and to whatever such use the present invention be put, a heat absorbing media, i.e., steel balls 42 are first charged to chute 40 to deposit on the perforated segments 3 making up grate 2, a bed of the steel balls 42. Since the balls 42 are relatively large, spherical in shape and deposited in random order, the balls do not prevent a flow of gas through the perforation 4. Particles of material 48 to be processed in reactor 1, and sized by screen 50 to be smaller than balls 42, are charged by conveyor 53 to hopper 46 and deposited on top of steel balls 42 as motor 12 turns pinion gear 13 to rotate ring 14 and the annular grate 2 in the direction indicated by the arrow in FIG. 1, and carries a segment 3 from beneath chute 40 to position beneath hopper 46. The grate segment so loaded then moves into chamber 22. On chamber 22 the steel balls 42 absorb heat because either the gases coming in conduit 30 have been heated or have become heated while passing downward through material 48 that has been heated before being charged onto grate 2, or the gases reaching the steel balls may be hot for both such reasons. Such heat absorbed by the steel balls 42 is stored and carried into chamber 23 by these balls. In chamber 23 the heat stored in the steel balls 42 is transferred to a gas stream passing therethrough. If the operation is one in which the particles 48 are at a higher temperature than the balls 42 the most efficient recovery of heat can be achieved if, as indicated in FIG. 2 at 34 and 37, the gas glow is in an upward direction. A segment 3 passing through chamber 23 then arrives at the discharge station 24 when the segment 3 is tilted to discharge the material 48 and balls 42 to the inclined screen 55. The mechanism for supporting and tilting each segment 3 passing through discharge station 24 may be of any suitable design and construction such as, for example, is shown in U.S. Pat. 2,256,017 of 1941. Treated material 48 and steel balls 42 falling upon screen 55 will be separated with the pieces of material 48, being smaller than balls 42, falling through screen 55 to conveyor 59. The steel balls tumbling down the upper surface of screen 55 are cleaned of surface deposits by such tumbling action and delivered free of other material to conveyor 56 for recycling to chute 46. Each grate segment 3 after dumping its load of both steel balls 42 and treated material 48 at discharge station 24, immediately re-enters the adjacent ball charging zone 20 where a bed of steel balls 42 is redeposited thereon. Then substantially the entire grate 2 is uniformly loaded, except for grate segments 3 passing through discharge station 24, with steel balls 42 that act both as a heat transfer media and a grate protecting media which along with side wall refractory brick 5 protect the grate from the gases passing through chambers 22 and 23.

From the foregoing detailed description of the present invention, it has been shown how the objects of the invention have been attained in a preferred manner. However, modifications and equivalents of the disclosed concepts such as readily occur to those skilled in the art are intended to be included within the scope of this invention as claimed.

The embodiments of the invention in which an exclusive property or privilege is claimed are defined as follows:

1. In an apparatus including an annular rotary reactor assembly having support structures, a horizontal rotatable annular grade defining a horizontal annular path and including a plurality of grate segments each having a plurality of perforations of substantially uniform predetermined size and means for supporting the segments for movement around the annular path, driving means engaging the grate for rotating the segments in a predetermined clock reference direction about a vertical axis centrally located within the annular path, means connected to the support structures and engaging the grate to discharge material from each segment passing a prelocated discharge station, and gas confining structures connected to the support structures for support in fixed position over and beneath the rotatable grate and defining at least a first and second chamber for directing a first gas flow through the perforated grate segments in the first chamber and a second gas flow through the perforated grate segments in the second chamber:

(a) a plurality of particles of heat absorbing media of a predetermined size larger than said grate perforations;

(b) a media chute for holding a supply of the media, the chute projecting downwardly from the top of the gas confining structure over the grate and having a lower terminal lip in close spaced relation to the top surface of the segments of the grate and adjacent a side of the discharge station located in the predetermined grate rotation direction from the center of the discharge station, for depositing the media as a bed layer upon the grate;

(c) a hopper projecting downwardly from the top of the gas confining structure over the grate to a position spaced above the lower terminal lip of the media chute and adjacent a side of the media chute opposite the discharge station; and (d) means for delivering to the hopper particles of material for deposit as a layer on top of the bed of media and for treatment thereon while carried by the segments rotating around the annular path through the chambers to the discharge station.

2. In an assembly according to claim 1, chute feeding media conveying means for delivering the media to the chute, and separating means arranged to receive media and other material discharged from the grate at the discharge station, the separating means being constructed and operative to deliver the media to the chute feeding conveying means substantially free of other material.

3. In an assembly according to claim 2 the media comprising steel balls.

4. In an assembly according to claim 2 the media being of a substantially uniform predetermined size and the means for delivering particles of material to the hopper including a screen constructed and operative to deliver to the hopper particles of material selected to be smaller than the media.

5. In an assembly according to claim 4 the separating means comprising a screen constructed and operative to deliver media to the chute feeding conveying means substantially free of other material.

References Cited

UNITED STATES PATENTS 3,374,998 3/1968 Stirling ............. 266—21

FOREIGN PATENTS 610,660 10/1948 Great Britain.

EDWARD G. FAVORS, Primary Examiner

U.S. Cl. X.R.

266—21